United States Patent
Muller

[15] 3,693,325
[45] Sept. 26, 1972

[54] DEVICE FOR SEPARATING FOAM INTO ITS CONSTITUENT LIQUID AND GASEOUS PHASES

[72] Inventor: Hans Muller, Im Allmandli, Erlenbach, Zuerich, Switzerland

[22] Filed: Feb. 11, 1971

[21] Appl. No.: 114,598

[30] Foreign Application Priority Data

Feb. 16, 1970    Switzerland..............2205/70

[52] U.S. Cl......................55/178, 195/135, 252/361
[51] Int. Cl..............................................B01d 19/02
[58] Field of Search......55/45, 52, 41, 178, 203, 409; 195/134, 135; 210/360 A; 252/361

[56] References Cited

UNITED STATES PATENTS

| | | | |
|---|---|---|---|
| 3,616,260 | 10/1971 | Muller | 55/178 X |
| 3,577,868 | 5/1971 | Muller | 55/178 |
| 3,501,414 | 3/1970 | Mueller | 55/178 X |
| 2,610,155 | 9/1952 | Humfield et al. | 55/178 |
| 1,967,938 | 7/1934 | Jantzen et al. | 55/178 |
| 1,906,526 | 5/1933 | Bradford | 55/178 |

*Primary Examiner*—Reuben Friedman
*Assistant Examiner*—R. W. Burks
*Attorney*—Michael S. Striker

[57] ABSTRACT

A housing defines a chamber for foam consisting of a gaseous and liquid phase. A rotatable shaft extends from the exterior to the interior of the housing; the portion located in the interior of the housing is in form of a tubular hollow shaft portion connected with the remainder of the shaft which extends to the exterior of the housing and is of solid cross section. The portion of the shaft of solid cross-section is gas-tightly surrounded by a stationary conduit and an annular sealing element of elastomeric material is either fast with the conduit in the interior of the housing and has a lip which engages the sealing surface on the rotatable hollow tubular shaft portion, or is fast with the hollow tubular shaft portion and has a lip which engages a sealing surface on the stationary conduit, in either case in sliding relationship. Foam-breaking elements are carried for rotation by the hollow tubular shaft portion and define with one another gaps extending radially of the latter and communicating with the interior of the hollow tubular shaft portion, with the interior in turn communicating with the space between the conduit and the solid cross-section shaft portion so that gaseous phase separated from the liquid phase by the foam-breaking elements can escape from the housing in this manner.

8 Claims, 2 Drawing Figures

DEVICE FOR SEPARATING FOAM INTO ITS CONSTITUENT LIQUID AND GASEOUS PHASES

CROSS REFERENCE TO RELATED APPLICATIONS

A related application was filed on Jan. 31, 1968 in my name under Ser. No. 702,053; it is now U.S. Pat. No. 3,501,414.

BACKGROUND OF THE INVENTION

From the aforementioned U.S. Pat. No. 3,501,414 it is already known to provide a separating device for separating the gaseous phase from a liquid phase where the two phases have been admixed and form a foam. According to the teaching of the aforementioned patent an apparatus for effecting such separation comprises a housing which defines an inner chamber adapted to contain a quantity of foam of gaseous phase and liquid phase in intimate dispersion. A shaft is provided which rotates in the housing and carries two or more funnel-shaped members serving for breaking up of the foam, with one of these members being nested within the other and with the two of them together defining between their respective outer and inner circumferential surfaces an annular gap in which separation of the gaseous phase from the liquid phase is effected by centrifugal deposition of the liquid phase on the inner circumferential surface of the outermost member. The shaft itself is hollow and provided with apertures communicating with the aforementioned gap so that, as under the effect of centrifugal force the gaseous phase of the foam is separated from the liquid phase thereof, the gaseous phase can escape through these apertures into the interior of the shaft and through the shaft to the exterior of the housing. The shaft itself passes through an opening provided for this purpose in the housing to the exterior of the latter, being journalled in a sealed bearing.

It has been found, however, that if an apparatus of the general type under discussion herein is required to separate large quantities of gaseous phase from the liquid phase, so that concomittantly large quantities of gas must be capable of being vented to the exterior of the housing, large cross-sectional dimensions must be available in the interior of the hollow shaft to permit the evacuation of the separated gaseous phase. This, of course, requires that the rotating hollow shaft have a correspondingly large outer diameter and the components necessary for journalling it for rotation and for sealing it must have correspondingly large dimensions. Experience has shown that this is disadvantageous for several reasons, for instance because it is expensive in terms of material and labor to construct such large components and also to maintain — on such large components — the necessary small manufacturing tolerances. Particularly, if the apparatus provided with such an arrangement is of the type which withdraws gaseous phase resulting from the separation of foam in fermentation containers, it is necessary that the various components be readily sterilizable and be capable of being maintained in sterile condition without difficulty. This, then requires even more complicated constructions, where multiple seals are required, where special bearings are needed and other steps must be taken all of which, especially when the components involved are of large size, are highly expensive and complicated.

SUMMARY OF THE INVENTION

It is, accordingly, an object of the present invention to provide an apparatus of the general type under discussion which permits the venting of large quantities of gaseous phase to the exterior of a housing in which the gaseous phase is separated from its intimate foam admixture with a liquid phase, but which is less complicated and less expensive to construct than was heretofore possible.

A concommitent object of the invention is to provide such an apparatus which is reliable in its operation, and relatively simple in its construction.

In pursuance of the above objects and of others which will become apparent hereafter, one feature of the invention resides in a device for separating foam into its constituent liquid and gaseous phases, which device briefly stated comprises a housing defining a chamber adapted to contain a quantity of foam consisting of a gaseous phase and a liquid phase in intimate dispersion. A rotatable shaft is provided comprising a hollow tubular first shaft portion located within the chamber, and a solid cross-section second shaft portion connected and coaxial with the first shaft portion and extending from the chamber to the exterior of the housing. Journalling means journals the shaft for rotation about its longitudinal axis and a stationary conduit gastightly surrounds the second shaft portion with spacing at least exteriorly of the housing, being connected with the first shaft portion in communication with the interior of the same. Annular sealing means seals the juncture of the conduit and first shaft portion and a plurality of foam-breaking elements is carried for rotation by the first shaft portion axially arrayed thereon. Consecutive ones of the foam-breaking elements define with one another respective annular gaps extending radially outwardly from the first shaft portion, and apertures in the latter communicate with the interior of the first shaft portion as well as with respective ones of the gaps. Thus, when the shaft and thereby the foam-breaking elements are rotated, centrifugal separation of the gaseous phase from the liquid phase takes place in the aforementioned gaps and the separated gaseous phase can escape through the apertures into the hollow interior of the first shaft portion, and from there into the spacing between the stationary conduit and the second shaft portion with subsequent venting at the outside of the housing.

The novel features which are considered as characteristic for the invention are set forth in particular in the appended claims. The invention itself, however, both as to its construction and its method of operation, together will additional objects and advantages thereof, will be best understood from the following description of specific embodiments when read in connection with the accompanying drawings.

DESCRIPTION OF THE PREFERRED EMBODIMENTS

Figure 1:
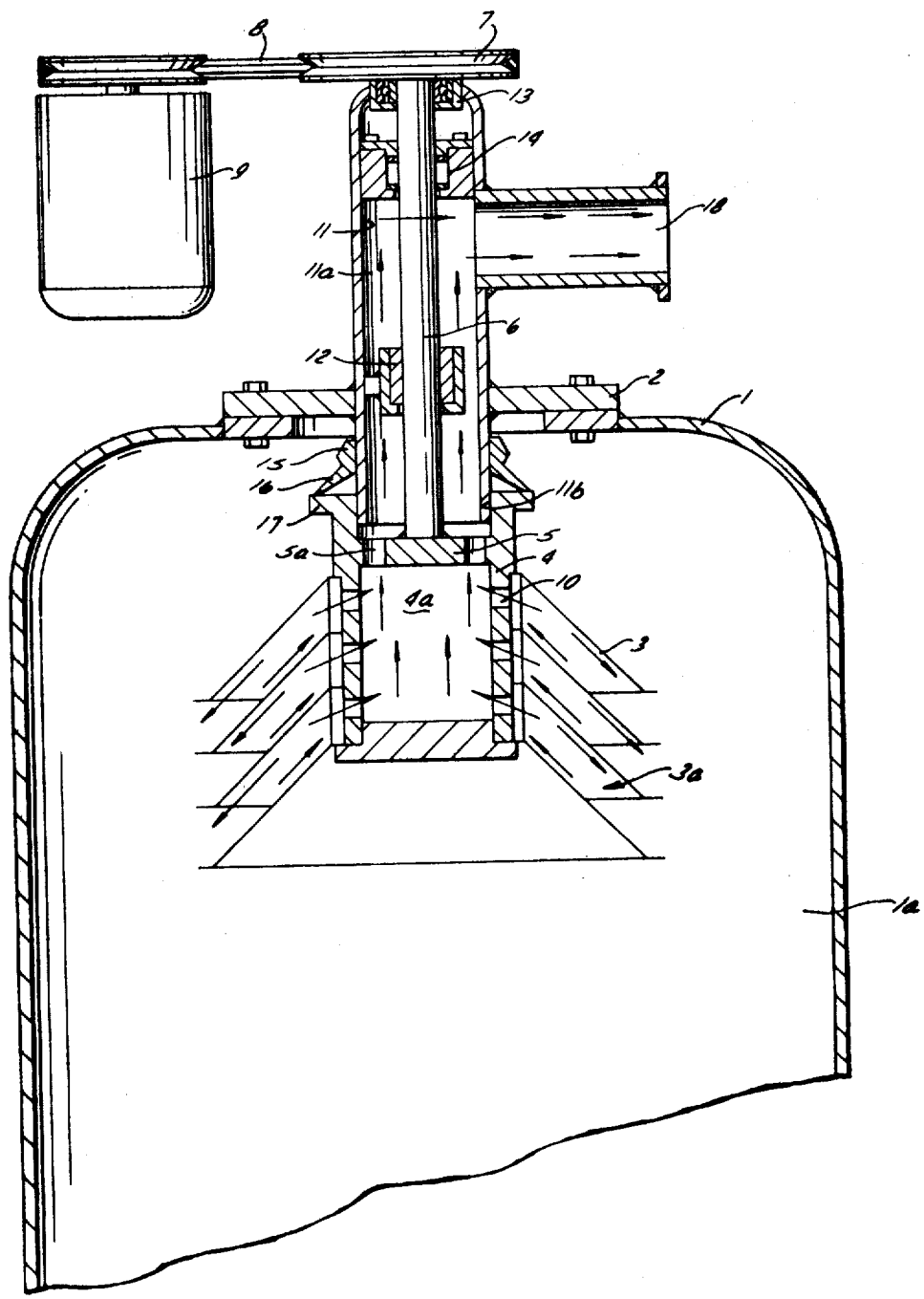
FIG. 1 is a fragmentary vertical section through an upper portion of an apparatus constructed in accordance with one embodiment of the invention.

Discussing now the drawing in detail, and firstly the embodiment illustrated in FIG. 1, it will be seen that reference numeral 1 generally identifies a container or housing adapted to contain the foam which consists of a gaseous phase and a liquid phase in intimate dispersion, and whose phases are to be separated. The housing has an interior chamber 1a in which this foam is accommodated. The aforementioned U.S. Pat. No. 3,501,414 describes in more detail how such foam can originate and, although the origin of the foam is of no consequence for the purposes of the present invention, reference may be had to that patent for further information concerning this aspect.

The housing 1 is provided with a foam-breaking arrangement which is secured to it by means of the flange 2.

The foam-breaking arrangement is composed of a plurality of nested conical foam-breaking elements 3 defining with one another gaps 3a each of which will be seen to be provided with two arrows, one pointing into the gap and one pointing out of the gap. The arrow pointing into the gap indicates the direction of flow of the gaseous phase which takes place when foam is separated within said gaps 3a into its constituent gaseous and liquid phases; the arrow pointing out of the respective gaps 3a indicates how the separated liquid phase returns into the chamber 1a.

The foam-breaking elements 3 are carried axially arrayed on an inner shaft portion 4 which is of hollow tubular configuration and provided with apertures 10 each of which communicates with one of the gaps 3a. The hollow interior of the shaft portion 4 is identified with reference numeral 4a.

The shaft portion 4 is connected via an aperture plate or similar element 5 with a second or outer shaft portion 6 which has a considerably smaller diameter than the shaft portion 4 and which is of solid cross-section. The upper open end of the shaft portion 6 extends to the exterior of the housing 1 and carries a pulley 7 about which there is trained a drive belt or analogous means 8 which is driven by an electromotor 9 diagrammatically illustrated in FIG. 1. Thus, the shaft portions 4 and 6 can be rotated in unison and the foam which enters into the gaps 3a of the similarly rotating foam-breaking element 3 is separated due to centrifugal action into its constituent liquid and gaseous phases with the gaseous phase escaping through the apertures 10 into the interior of the shaft portion 4.

The shaft portion 6 is surrounded with spacing by a stationary conduit 11 and aperture 5a in the plate 5 communicates with the annular gap —identified with numeral 11a— which exists between the outer surface of the shaft portion 6 and the inner surface the conduit 11 and which in turn communicates with the interior of an outlet conduit 18. In this manner, then, the gaseous phase can escape from the interior of the housing 1.

As FIG. 1 shows, the shaft portion 6 is journalled in journals 12 and 13 whose particular structural details are of no consequence with respect to the present invention. Reference numeral 14 identifies as seal — either a sliding-ring seal or a conventional stuffing box or the like —which seals the shaft portion 6 and the space 11a with respect to the exterior of the housing 1, that is with respect to the ambient atmosphere.

In the embodiment of FIG. 1, an element 15 surrounds that portion of the stationary conduit 11 which is located within the chamber 1a and has a free sealing lip 16 which sealingly engages a sealing surface provided on the flange-shaped upper end portion of the rotating inner or first tubular shaft portion 4. The element 15, which advantageously is of elastomeric material, such as rubber or suitable synthetic plastic, is stationary by being suitably fast with the conduit 11. The pressure differential between the interior of the chamber 1a and the space 11a is relatively small, and in any case small enough so that this seal is adequate for preventing the entry of foam — that is non-separated gaseous and liquid phases — into the space 11a between the juxtaposed but non-connected surfaces 11b of an end portion of the conduit 11 and of a recess into which this end portion extends and which is provided for this purpose in the shaft portion 4. A small pressure difference serves to press the free lip 16 against the surface on the flange portion 17, as is known from this type of seal.

The sealing element 14 may be a sliding-ring seal as pointed out before, it may conventional stuffing box and it may also be a different type of seal utilized with or without a separate sealing fluid as sealing means, as desired. These details are known from the art and do not form a part of the present invention.

Figure 2:
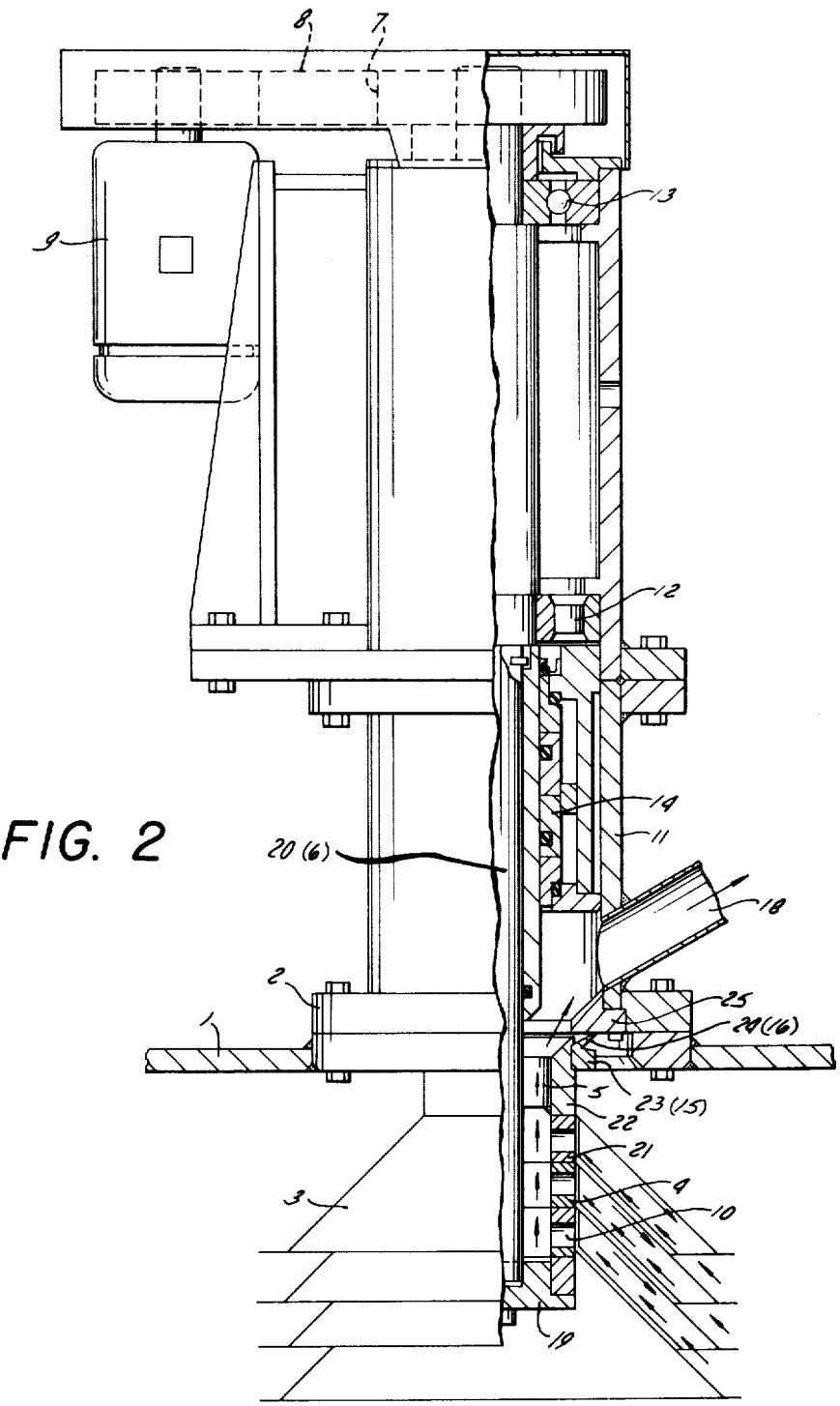
FIG. 2 is a fragmentary illustration of an apparatus incorporating a further embodiment of the invention, in elevation in the left-hand side of the Figure and in vertical section in the right-hand side of the Figure.

Coming to the embodiment illustrated in FIG. 2 of the drawing, it will be seen that it essentially resembles that of FIG. 1. Here, however, the tubular portion 4 of FIG. 1 is replaced with a plurality of rings 21 which carry the foam breaker elements 3. An uppermost ring 22 carries the sealing element 23 which corresponds to the sealing component 15, 16 of FIG. 1 and with the sealing lip 24 abutting the sealing surface provided on a slide-ring 25 which is fast with the inner end portion of the stationary conduit 11. An end plate 19 connects the hollow inner portion of the shaft — composed of the rings 21 and 22 — with the solid cross-section portion 20 of the shaft, and the ring 22 is connected with the portion 20 by means of radial ribs or the like.

It will be seen that FIG. 2, in which like reference numerals identify like elements as in FIG. 1, differs from that Figure essentially in that in FIG. 2 the sealing component 23 is mounted on the rotating hollow shaft portion and cooperates with a surface on the stationary slide-ring 25, by contrast to FIG. 1 where the sealing element 15 is mounted on the stationary conduit 11 and cooperates with a sealing surface on the rotating flange portion 17 of the inner shaft portion 4.

By resorting to my invention the purposes of the application, i.e., the objects as set forth above are achieved fully and in a highly advantageous manner. The sealing and journalling elements necessary have only a size which is necessary for the solid cross-section portion (6 or 20) of the rotating shaft and only a single seal to the exterior of the housing is necessary so that it can be constructed for a high 15 internal pressure than would otherwise be possible. At the same time, however, a large internal cross-section is provided for the passage through which separated gaseous phase is to be vented to the exterior. Also, by resorting to my invention the constructions obtained can be readily sterilized and maintained sterilized.

It will be understood that each of the elements described above, or two or more together, may also find a useful application in other types of constructions, differing from the types described above.

While the invention has been illustrated and described as embodied in a device for separating foam into its constituent liquid and gaseous phases, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. A device for separating foam into its constituent liquid and gaseous phases, comprising a housing defining a chamber adapted to contain a quantity of foam consisting of a gaseous phase and a liquid phase in intimate dispersion; a rotatable shaft, comprising a hollow tubular first shaft portion located within said chamber, and a solid cross-section second shaft portion connected and coaxial with said first shaft portion and extending from said chamber to the exterior of said housing; journalling means journalling said shaft for rotation about its longitudinal axis; a stationary conduit gastightly surrounding said second shaft portion with spacing at least exteriorly of said housing and being connected with said first shaft portion in communication with the interior of the same; annular sealing means sealing the juncture of said conduit and first shaft portion; a plurality of foam-breaking elements carried for rotation by said first shaft portion axially arrayed thereon, consecutive ones of said elements defining with one another respective annular gaps extending radially outwardly from said first shaft portion; and apertures in said first shaft and communicating with the interior of the same as well as with respective ones of said gaps, rotation of said shaft and elements resulting in centrifugal separation of said gaseous phase from said liquid phase in said gaps and escape of said gaseous phase through said apertures and first shaft portion into said conduit.

2. A device as defined in claim 1, said conduit having a peripheral wall; and wherein said second shaft portion extends through said peripheral wall in rotatable but gas-tight relationship therewith.

3. A device as defined in claim 2, said second shaft portion having an exterior section located outside said conduit; and further comprising drive means operatively associated with said exterior section for imparting rotation to said shaft.

4. A device as defined in claim 1, said first shaft portion having an axis of rotation and an annular surface surrounding said axis of rotation adjacent to said stationary conduit; and wherein said annular sealing means comprises an annular sealing element of elastically deformable material fast with said conduit concentric with said axis of rotation and having an annular sealing lip engaging said annular surface in sliding relationship therewith.

5. A device as defined in claim 4, said conduit having an inner end portion located within said chamber adjacent said annular surface of said first shaft portion; and wherein said annular sealing element is fast with said inner end portion in sealtight relationship therewith.

6. A device as defined in claim 5, wherein said annular sealing element is at least predominantly composed of elastomeric material.

7. A device as defined in claim 1, said conduit having an inner end portion located within said chamber proximal to said first shaft portion and having an annular surface concentric with the axis of rotation of said shaft; and wherein said annular sealing element is fast with said first shaft portion and comprises a sealing lip slidingly engaging said annular surface in sealing relationship therewith.

8. A device as defined in claim 7, wherein said annular sealing element is at least predominantly composed of elastomeric material.

* * * * *